March 16, 1948.  H. McM. GRIFFIN  2,437,813
CONTROL FOR MACHINE TOOLS
Filed Oct. 26, 1943  2 Sheets-Sheet 1

INVENTOR.
HARRY McMURTRY GRIFFIN
BY
ATTORNEY

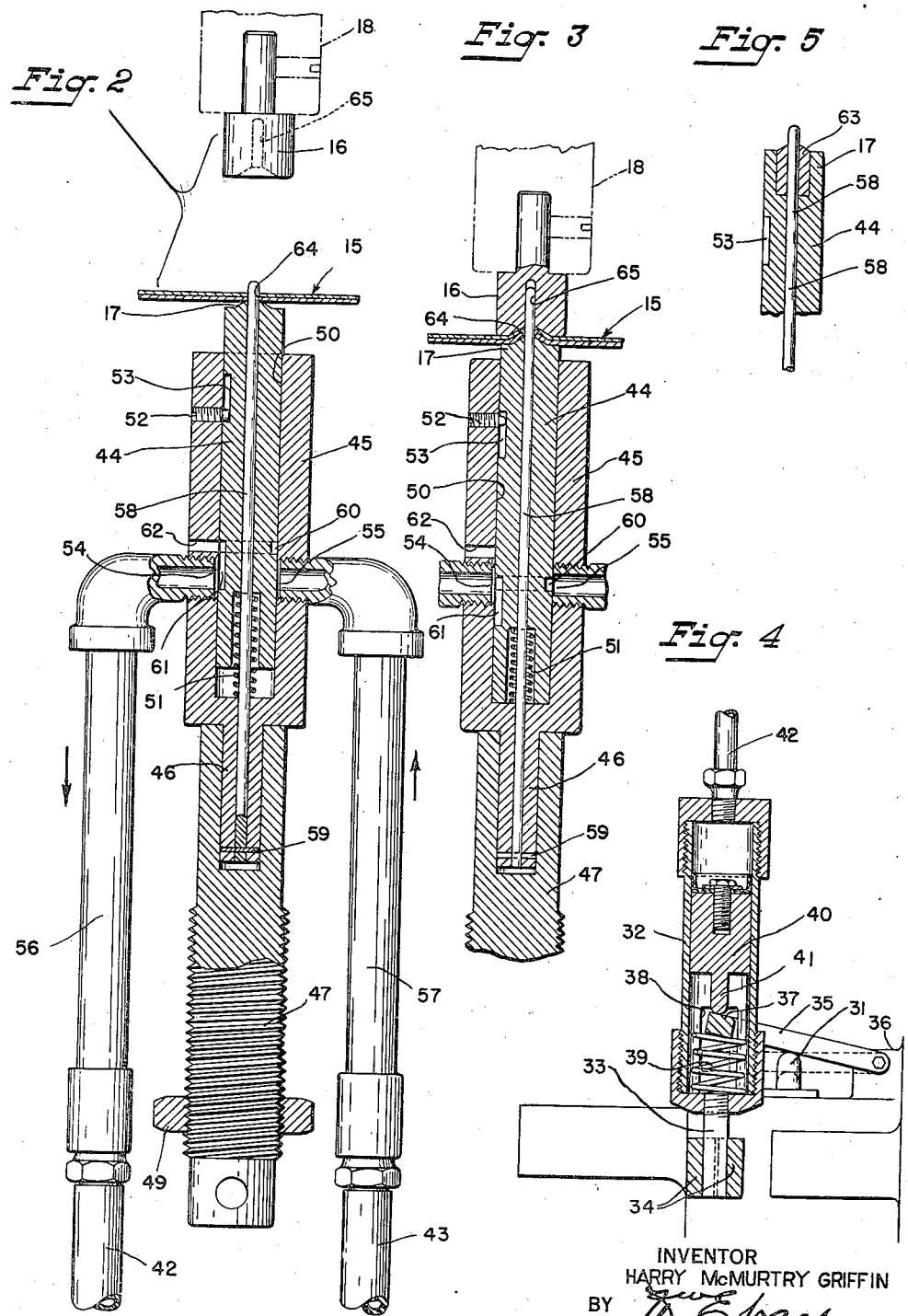

Patented Mar. 16, 1948

2,437,813

UNITED STATES PATENT OFFICE 2,437,813

CONTROL FOR MACHINE TOOLS

Harry McMurtry Griffin, Webster Groves, Mo., assignor to Curtiss-Wright Corporation, a corporation of Delaware Application October 26, 1943, Serial No. 507,768

7 Claims. (Cl. 153—21)

This invention relates to improvements in controls for machine tools, and more particularly is concerned with a control which will permit operation of the machine with which it is associated only when the work is properly disposed with relation to those parts of the machine which are to operate upon, or process, the work.

Machines of the character generally described have heretofore been provided with a control lever which the operator may actuate, at will, after arranging the work in what he considers to be the proper relation with respect to the working parts of the machine. The operation of such a machine is, depending upon the skill of the particular operator, usually accompanied with considerable wastage of the material being processed as a result of the premature operation of the machine, that is to say, the operation of the machine before such material has been arranged in the machine in the proper relation to the working parts thereof.

The principal object of the present invention, therefore, is to overcome the above objection, this object contemplating a control which, when employed in connection with a machine of the character described, will be actuated by the work when, and only when, the latter has been properly arranged in the machine.

A further object is to provide a control which may be applied as an attachment to existing machines.

A still further object is a novel design and arrangement of the parts of the control, whereby to increase substantially the efficiency of the machine with which it may be associated and at the same time enable such machine to be operated more safely and with less effort than would otherwise be possible.

The control is illustrated in the accompanying drawings, wherein:

Figure 2 is an enlarged detail view, partially in section and partially in elevation, of the work-actuated mechanism of the control, the parts being shown in the positions they normally occupy to prevent operation of the machine.

Figure 3 is a generally similar view showing the parts of the work-actuated mechanism in the positions to which they are moved to effect the operation of the machine.

Figure 4 is an enlarged sectional view of the actuator which is operative in response to the regulated flow of actuating fluid to directly control the operation of the machine.

Figure 5 is a detail sectional view of a modified form of work-engaging element for the work-actuated mechanism.

Figure 1:
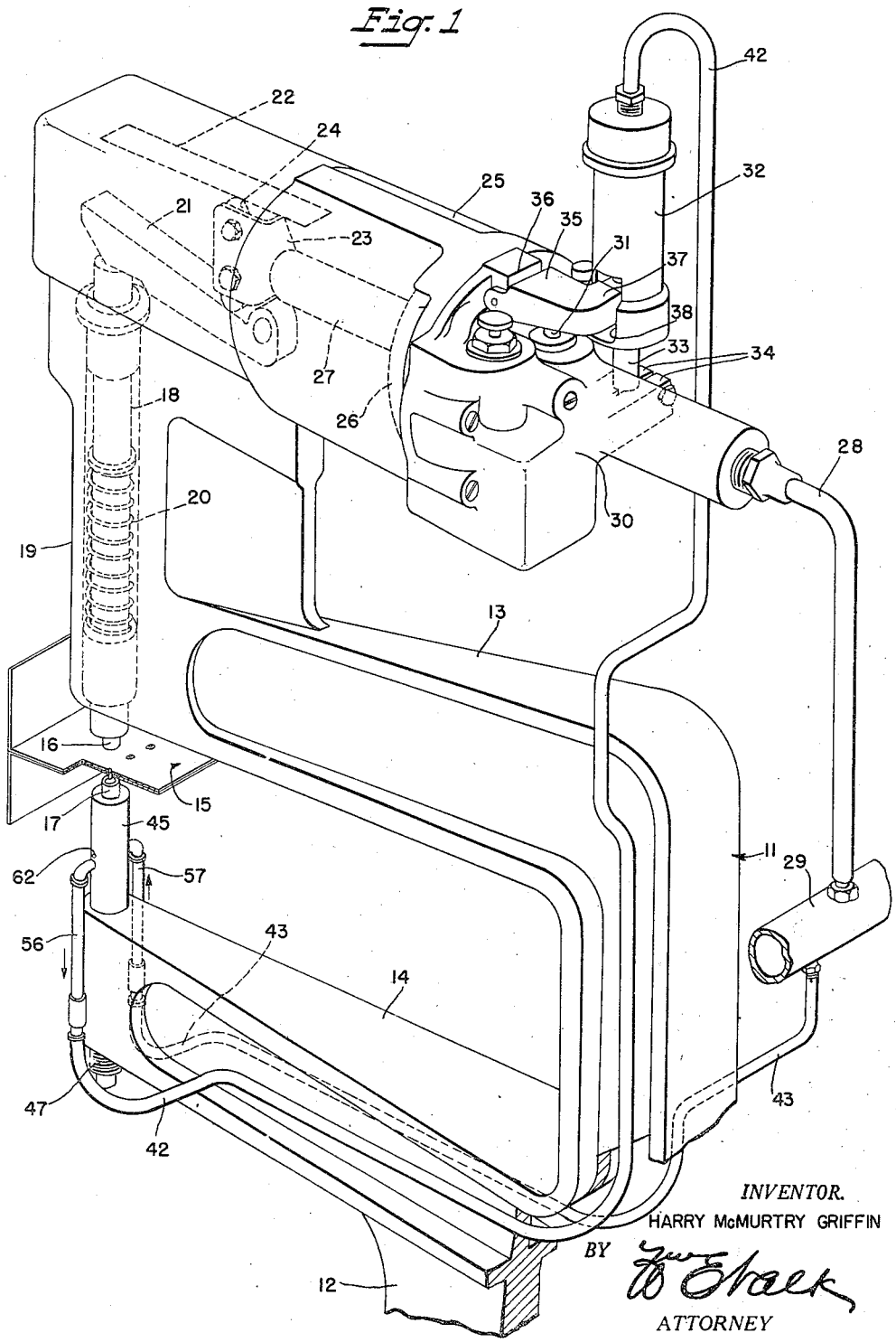
Figure 1 is a perspective view of a machine tool with a control embodying the features of the invention applied thereto.

The control is illustrated and described in connection with a counterpress or dimpling machine. It is to be understood, however, that this is intended to be by way of example only and that the control may, advantageously, be incorporated in, or applied to, machine tools designed to perform various shearing, perforating and forming operations.

The counterpress with which the control is illustrated includes a framework 11 which may be mounted upon a suitable pedestal 12, upper and lower arms 13 and 14, respectively, of the framework defining a space for accommodating the work 15 to be operated upon by an upper die element 16 and a lower die element 17. The mechanism for actuating the upper die element may be of any conventional design and forms no part of the present invention. It is, therefore, sufficiently illustrated for the purpose in view by a showing of a plunger 18 which carries the upper die element and which is mounted for reciprocatory movement in a vertical column 19 of the framework, a spring 20 which normally holds the plunger 18 at the upper limit of its range of movement, a pivotally mounted lever 21 which in the direction of its free end converges toward a stationary track 22, a reciprocatory head 23 having rollers 24 which engage the track 22 and the upper side of the lever 21, and an air motor 25 having a piston 26 which is connected to the head 23 by a rod 27 and which is operative to advance the head 23 to move the plunger 18 downwardly against the action of the spring 20 and thereby move the upper die element downwardly through the full range of its working stroke, the spring 20 automatically restoring the plunger to its normal retracted position when the piston 26 is returned to its normal position. The motor 25 is connected by a branch line 28 to a main compressed air line 29. The flow of air from the branch line to the motor is controlled by a suitable valve (not shown) in the head 30 of the motor, the said valve being normally biased to a closed position and having a control stem 31 projecting upwardly out of the head.

An actuator for the air valve is mounted on the head 30 of the motor. As best shown in Figure 4, it includes a tubular casing 32. The latter is provided with a mounting pin 33 which is clamped between laterally extending arms 34 on the head 30 of the air motor. A control lever 35 which is pivotally connected to a rib 36 on the motor head is located over, and normally contacts the valve stem 31, the outer end 37 of the said lever extending laterally through a slot 38 in the casing 32 and resting upon a spring 39. A piston 40 for actuating the lever 35 to open the air valve of the motor is located in the casing 32, a stem 41 which depends from the lower side of the piston resting upon the outer end of the control lever. Compressed air may be admitted to the casing 32 through a line 42 to move the piston 40 to actuate the control lever.

The compressed air which is admitted to the line 42 for the purpose described is supplied from the main line 29 through a branch line 43. In accordance with the invention communication between the lines 42 and 43 is controlled by a plunger 44 (Figures 2 and 3), the upper end of which carries, or provides, the die element 17. The plunger is mounted for axial movement in an open ended cylinder 45 which is formed with a reduced shank 46. The latter is accommodated in an externally threaded socket member 47 which is screwed into a threaded bore at the outer end of the arm 14, the socket member being adjustable in the arm to enable the socket-cylinder-plunger assembly to be properly located with relation to the die member 16 and being secured in the desired position of adjustment by a lock nut 49.

The plunger 44 is axially movable in the bore 50 which it occupies. Normally a spring 51 holds it at an upper limit which is determined by a stop screw 52, the inner end of which extends into a longitudinally extending slot 53 formed in the side wall of the plunger and engages the lower end wall of the slot. The end wall of the bore 50 provides a seat which the plunger engages and rests upon at the lower limit of its range of movement, the spring 51 being wholly accommodated within an enlarged section of a bore, which is formed through the plunger, when the latter is located at such limit. Oppositely located ports 54 and 55 are formed in the side wall of the cylinder 45, a coupling 56 connecting the line 42 to the port 54 while a similar coupling 57 connects the line 43 to the port 55. Both ports communicate with the bore 50. However, communication between them is cut off by the plunger 44 when the latter is in the normal extended position shown in Figure 2.

A pilot rod 58 which is located in the bore in the plunger 44 and an aligned bore in the shank 46 is secured in the shank by a cross pin 59, the upper end of the pilot rod extending above the working face of the die element 17 in the extended position of the plunger. The pilot rod is thus fixed against longitudinal movement but permits the plunger 44 to move between the upper and lower limits fixed by the stop screw 52 and the end wall of the bore 50.

At the lower limit of its range of movement (Figure 3) the plunger 44 is adapted to permit the air lines 42 and 43 to communicate directly with one another. To this end an annular channel 60 is formed in the plunger, being so located that it registers with the ports 54 and 55 when the plunger is located at the lower limit of its range of movement. In this connection it will be noted (Figure 2) what when the plunger 44 is located at the upper limit of its range of movement, the channel 60 communicates with a vent opening 62 in the wall of the cylinder 45 while a branch channel 61 connects the port 54 to the channel 60, whereby the compressed air in the line 42 may escape after each operation of the machine and thus permit the piston 40 and the control lever 35 to return to their normal inoperative positions.

Assembling of the work-actuated mechanism may be readily effected by first inserting the pilot rod 58 in the cylinder 45 and securing its lower end in the bore in the shank 46. The spring 51 is then slipped over the pilot rod and is located at the bottom of the bore 50. The plunger 44 may thereafter be introduced into the bore 50, the pilot rod being guided through the bore in the plunger, and adjusted until the stop screw 52 enters the slot 53. The shank 46 on the cylinder is then inserted in the bore in the socket member 47, is turned to adjust the cylinder and plunger in the proper relation with respect to the die element 16 and is locked in such position. The air lines 42 and 43 are then connected to the ports 54 and 55 by the couplings 56 and 57.

A modified form of plunger 44 for use in the cylinder 45 is illustrated in Figure 5. In this embodiment the die element comprises a replaceable insert 63 having a working face of the desired contour. Preferably the said insert is hardened to resist the severe wearing action to which die elements of this character are subjected. The construction described has the advantage that when the die element has been worn to such a degree as to be no longer suitable for further use, it may be renewed without necessitating replacement of the plunger.

The invention contemplates the actuation of the plunger 44 by the work when the latter has been located in the proper relation with respect to the die elements, or other parts which may be employed to operate upon the work; and the construction shown and described has this object in view. Thus, assuming the machine to be employed for dimpling and the work 15 to comprise pre-drilled sheet material, the latter is introduced between the die elements and manipulated to cause the pilot rod 58 to enter a selected one of the drilled holes 64. When this occurs, the material may be lowered upon the die element 17, the plunger 44 in response to the weight of the material and the pressure applied by the operator through the material, either or both, moving downwardly against the action of the spring 51 until it rests upon its seat. During such movement of the plunger the annular channel 60 moves into registration with the ports 54 and 55. Thereupon compressed air is admitted from the line 43 into the line 42 and the piston 40 of the actuator is moved downwardly against the action of its spring to move the stem 31 of the valve of the air motor 25 downwardly and thereby admit air from the line 28 to the motor. The piston 26 in response to the air admitted to the motor moves forwardly and thereby actuates the plunger 18 to cause the die element 16 to move downwardly and engage the work supported on the lower die element and to cooperate with the latter to deform the sheet material in accordance with the contour of the working faces of the die elements, the upper end of the pilot rod 58 entering a bore 65 in the die element 16 as the said die element moves to engage said work. Upon completion of the dimpling operation, the usual automatic release mechanism associated with the valve of the air motor cuts off the supply of air to the motor and the spring 20 returns the plunger 18 to its retracted position. Thereafter as the work is elevated to remove it from between the dies preparatory to the succeeding dimpling operation the spring 51 returns the plunger 44 to its normal position.

From the foregoing it will be apparent that in the operation of the machine, the pilot rod 58 will prevent the plunger 44 from being moved downwardly to admit air to the motor 25 until the work has been properly located with respect to the cooperating working elements. Wastage of material as a result of the operation of the machine, accidently, or otherwise, when the work is improperly arranged with respect to said elements is thus prevented. The construction described has the further advantage that injury to the operator as an incident to the operation of the machine, is minimized, it being unnecessary for the operator to place his hands near the zone in which the die elements operate. It will also be apparent that as the weight of the work is availed of to actuate the control as the work is moved to the position in which it is to be acted upon, additional movements of the work or the operation of a control lever are not involved. Fatigue of the operator is thus avoided in so far as controlling the operation of the machine is concerned.

I claim as my invention:

1. A sheet metal dimpling machine including cooperating working members between which sheet material to be acted upon may be introduced, means for advancing one of said members toward said material, the other of said members being in the form of a plunger, a cylinder having a seat for said other member, said other member being movably mounted in said cylinder and having an end which is engageable with said material and being formed with a longitudinally extending bore which is enlarged at one end, resilient means located in the enlarged end of said bore and acting against said seat normally to hold said other member in spaced relation with respect to said seat, a pilot rod occupying said bore and extending beyon the material-engaging end of said other member, said resilient means being operative to permit said other member to be moved relative to said pilot rod and toward said seat by said material when the latter is arranged in the position to which it may be guided by said pilot rod, and means responsive to the movement of said other member toward said seat for controlling the operation of said first named means.

2. A machine for dimpling sheet material including cooperating working members between which material to be acted upon may be introduced, a fluid-operated motor for advancing one of said members toward said material, the other of said members being in the form of a plunger and having one end formed to provide a dimple forming face and a section which provides a valve, a cylinder in which said other member is movably accommodated with said one end projecting from said cylinder, said cylinder having a seat for said other member and being formed with ports adapted to be opened and closed by said plunger valve section and through which actuating fluid may be supplied to said motor, and means for normally holding said other member in spaced relation with respect to said seat, in which position said valve closes said ports, said last named means being operative to permit said other member to be moved toward said seat by said material as the latter is arranged in a position to be acted upon by said members, whereby said valve opens said ports to permit actuating fluid to be supplied to said motor.

3. A machine for dimpling sheet material including cooperating working members between which material to be acted upon may be introduced, a fluid-operated motor for advancing one of said members toward said material, the other of said members being in the form of a plunger, a cylinder in which said other member is accommodated, said cylinder having a seat for said other member and being formed with ports through which actuating fluid may be supplied to said motor, said other member having an end which is engageable with said material, an end which is engageable with said seat and a body portion which provides a valve for opening and closing said ports and being formed with a longitudinally extending bore, a pilot rod in said bore having an end which extends beyond the material-engaging end of said other member, and resilient means for normally holding said other member in spaced relation with respect to said seat, in which position said valve closes said ports, said last mentioned means being operative to permit said other member to be moved relative to said pilot rod and toward said seat by said material as the latter is arranged in the position to which it may be guided by said pilot rod, whereby said valve opens said ports to permit actuating fluid to be supplied to said motor.

4. The combination in a sheet material dimpling machine having a fluid motor, fluid supply system and a first die element operated by the fluid motor, of a second die element for cooperation with said first die element in forming a dimple in the interposed sheet material, a cylinder in which said second die element is operably mounted, said second die element having a bore therethrough, a pilot rod occupying said bore and having one end extending beyond the material engaging end of said second die element, the opposite end of said pilot rod being secured in said cylinder, said cylinder having fluid flow connections in the fluid supply system for said motor, which fluid connections are adapted to be opened and closed to the passage of fluid by said second die element, and means adapted to urge said second die element to a position normally closing said fluid connections, said means being yieldable to permit movement of said second die element for opening said fluid connections to supply fluid to the motor upon interpositionment of the sheet material over said pilot rod.

5. In a dimpling machine having support means for a pair of cooperating working members, actuating means for opening and closing said support means respectively to permit introduction of a perforate work piece between the members and to cause the work piece to be deformed between the working faces of the members, said support means comprising a guide slidably supporting one member for extension from seated position thereon in a direction toward the other member and for return from extended position to the seated position, a pilot element carried by said guide and extending through the working face of said member for register with a perforation in the work piece, means for resiliently holding said member in said extended position, and means responsive to seating of said member for operating said actuating means to close the support means.

6. In a dimpling machine having support means for a pair of cooperating working members, actuating means for opening and closing said support means respectively to permit the introduction of a perforate work piece between the members and to cause the work piece to be deformed between the working faces of the members, said support means comprising a cylinder supporting one member for extension from seated position thereon in a direction toward the other member and for return from extended position to the seated position, the cylinder and said member having cooperating ports arranged for valve action during such relative movement, a pilot element carried by said cylinder and extending through the working face of said member for register with a perforation in the work piece, means for resiliently holding said member in said extended position, and a fluid pressure system for controlling said actuating means and controlled by said valve action.

7. In a dimpling machine having means for supporting and relatively advancing cooperating working members between which a work piece may be introduced and subsequently be deformed upon such advance, said means comprising a seat for one member and a guide supporting said one member for movement to and from said seat in the path of such advance, resilient means for holding said one member in spaced relation to the seat, said resilient means permitting said one member to be moved toward said seat by the work piece when the latter is arranged between the members and permitting said one member to be backed by said seat during deforming relative advance of the members, and means responsive to the movement of said one member toward said seat for controlling the relative advance of the members by the supporting means.

HARRY McMURTRY GRIFFIN.

REFERENCES CITED

The following references are of record in the file of this patent:

UNITED STATES PATENTS

| Number | Name | Date |
| --- | --- | --- |
| 2,328,919 | Merriman | Sept. 7, 1943 |
| 2,375,707 | Speller | May 8, 1945 |